United States Patent
Buchwitz et al.

(10) Patent No.: US 9,783,175 B2
(45) Date of Patent: Oct. 10, 2017

(54) CABLE MOUNTING ASSEMBLY

(71) Applicant: Ford Global Technologies, LLC, Dearborn, MI (US)

(72) Inventors: Joseph L Buchwitz, Huntington Woods, MI (US); James Adam Drozdowski, Canton, MI (US); Andrew Arthur Brown, Rochester Hills, MI (US); Jacob Peter Stencel, Casco Township, MI (US); Mason Otto Suksumake, Dearborn, MI (US); Richard Green, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 13/769,470

(22) Filed: Feb. 18, 2013

(65) Prior Publication Data
US 2014/0231597 A1 Aug. 21, 2014

(51) Int. Cl.
*F16M 11/14* (2006.01)
*B60T 11/04* (2006.01)
*F16C 11/10* (2006.01)
*F16C 11/06* (2006.01)
*F16D 125/58* (2012.01)
*F16D 125/60* (2012.01)

(52) U.S. Cl.
CPC ......... *B60T 11/046* (2013.01); *F16C 11/0661* (2013.01); *F16C 11/103* (2013.01); *F16D 2125/587* (2013.01); *F16D 2125/60* (2013.01)

(58) Field of Classification Search
CPC .. F16C 1/10; F16C 1/101; F16C 1/102; F16C 1/103; F16C 1/26; F16C 1/262; F16C 1/28; F16C 11/06; F16C 11/0661; F16C 11/103; B62D 7/16
USPC ...................... 403/122–144; 74/502.4, 502.6
See application file for complete search history.

(56) References Cited

U.S. PATENT DOCUMENTS

| | | | | |
|---|---|---|---|---|
| 1,386,959 | A | * | 8/1921 | Severance ................. B60R 1/04 224/482 |
| 2,011,493 | A | * | 8/1935 | Larsh .................... F16C 23/043 384/203 |
| 2,089,463 | A | * | 8/1937 | Ritz-Woller .............. B60R 1/06 248/481 |
| 2,161,433 | A | * | 6/1939 | Ritz-Woller .............. B60R 1/06 403/144 |
| 2,202,697 | A | * | 5/1940 | La Hodny ................. B60R 1/02 248/481 |
| 2,397,279 | A | * | 3/1946 | Le Vesconte ......... F16L 3/1233 248/74.3 |
| 2,439,009 | A | * | 4/1948 | Kujawski ................ F21V 21/26 248/276.1 |
| 2,822,143 | A | * | 2/1958 | Johansen ............... A45B 11/00 135/16 |

(Continued)

FOREIGN PATENT DOCUMENTS

| CA | 2364008 A1 | * 5/2002 |
|---|---|---|
| EP | 0790418 A1 | 8/1997 |

*Primary Examiner* — Kimberly Wood
(74) *Attorney, Agent, or Firm* — Raymond Coppiellie; Brooks Kushman P.C.

(57) ABSTRACT

A cable mounting assembly that may include a ball fitting having a hole that receives a cable assembly. The ball fitting may be disposed in an abutment and may be received in a bracket that may be disposed on the abutment.

14 Claims, 4 Drawing Sheets

(56) References Cited

U.S. PATENT DOCUMENTS

| | | | | |
|---|---|---|---|---|
| 3,038,730 A * | 6/1962 | Bentley | ............. | 277/507 |
| 3,182,329 A * | 5/1965 | Biesecker | ............. | 343/702 |
| 3,235,294 A * | 2/1966 | Naylor | ............. | B60R 1/06 |
| | | | | 248/481 |
| 3,239,257 A * | 3/1966 | White | ............. | B29C 45/14754 |
| | | | | 384/203 |
| 3,241,144 A * | 3/1966 | Berger | ............. | 343/702 |
| 3,292,958 A * | 12/1966 | Oishei | ............. | 403/132 |
| 3,411,373 A * | 11/1968 | Zieber et al. | ............. | 74/502.5 |
| 3,483,888 A * | 12/1969 | Wurzel | ............. | 137/539 |
| 3,512,162 A * | 5/1970 | Charles | ............. | H01Q 1/084 |
| | | | | 343/702 |
| 3,670,687 A * | 6/1972 | Rowley | ............. | B63H 21/265 |
| | | | | 440/62 |
| 3,699,580 A * | 10/1972 | Joseph et al. | ............. | 343/702 |
| 3,977,005 A * | 8/1976 | Cejka | ............. | H01Q 1/084 |
| | | | | 343/715 |
| 4,101,228 A * | 7/1978 | Scheerer | ............. | 403/137 |
| 4,462,790 A * | 7/1984 | Hansen | ............. | F23Q 9/04 |
| | | | | 431/264 |
| 4,565,107 A * | 1/1986 | Muller | ............. | 74/473.34 |
| 4,645,170 A * | 2/1987 | Sharp | ............. | B60R 1/06 |
| | | | | 248/478 |
| 4,763,541 A * | 8/1988 | Spease | ............. | F16C 1/105 |
| | | | | 248/56 |
| 4,790,205 A | 12/1988 | Stocker | | |
| 4,951,524 A * | 8/1990 | Niskanen | ............. | 74/502.4 |
| 5,391,014 A * | 2/1995 | Chen | ............. | B62J 11/00 |
| | | | | 188/2 D |
| 2002/0064419 A1 * | 5/2002 | Agostini | ............. | 403/122 |

\* cited by examiner

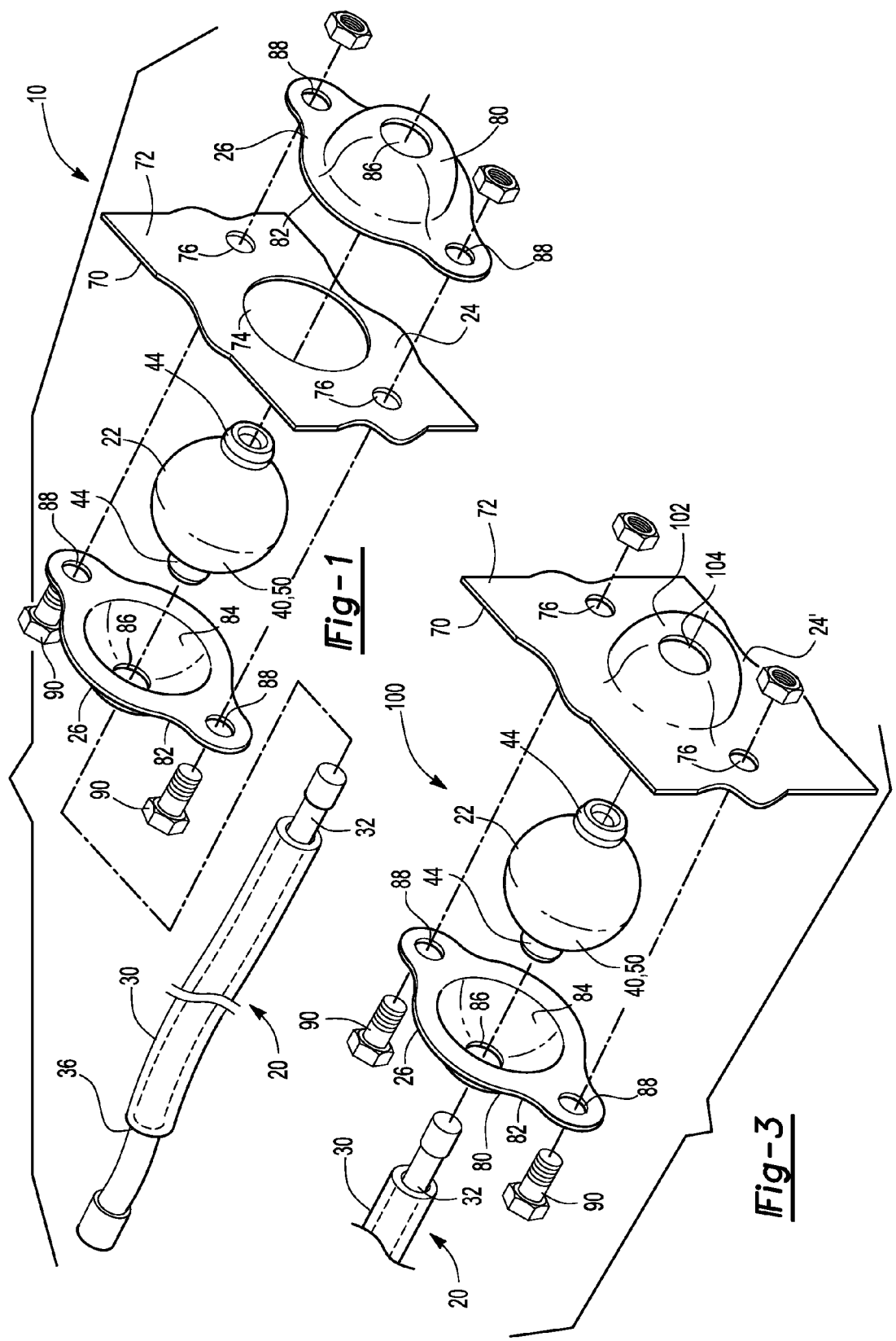

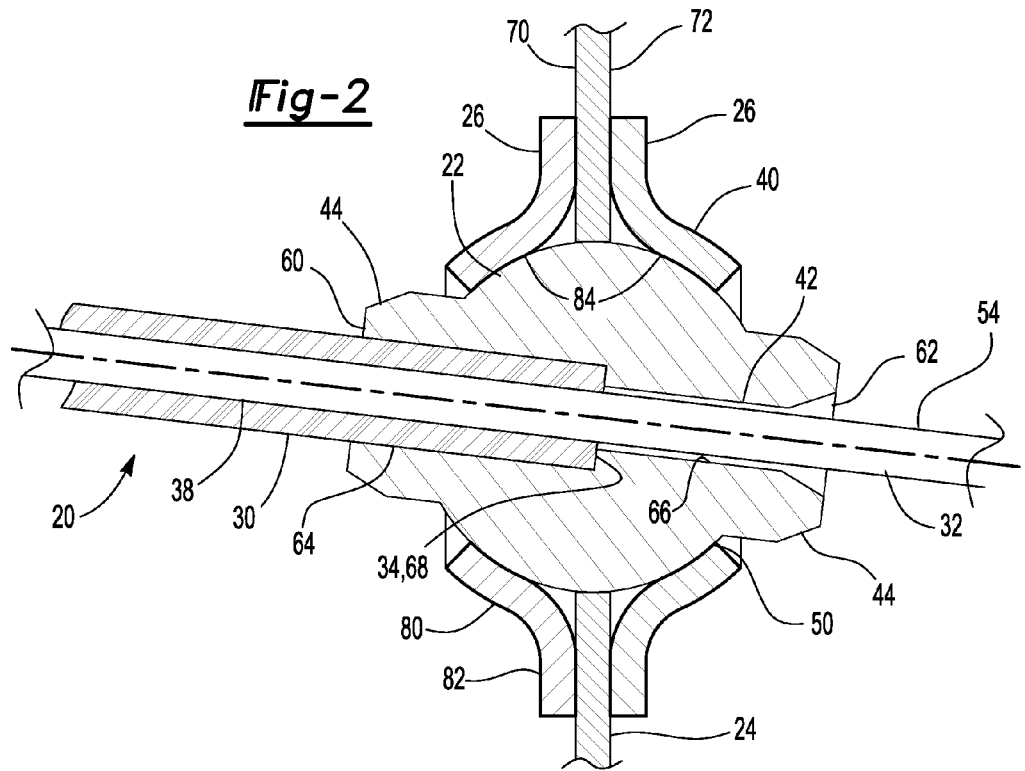

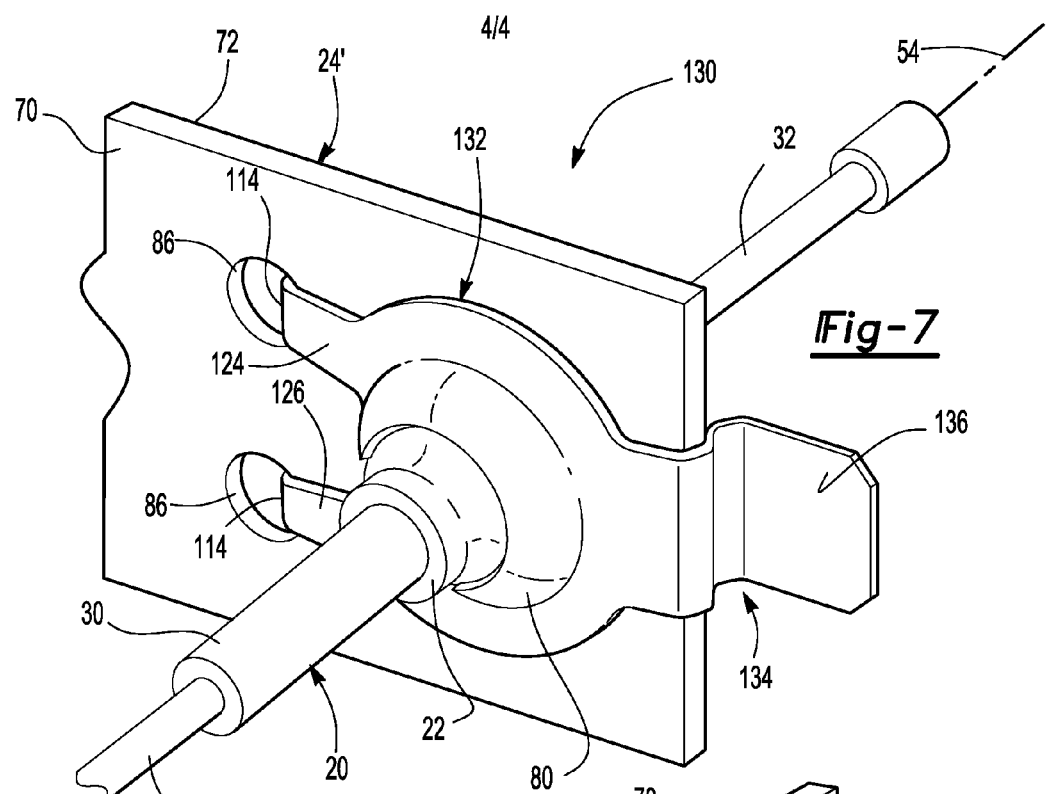
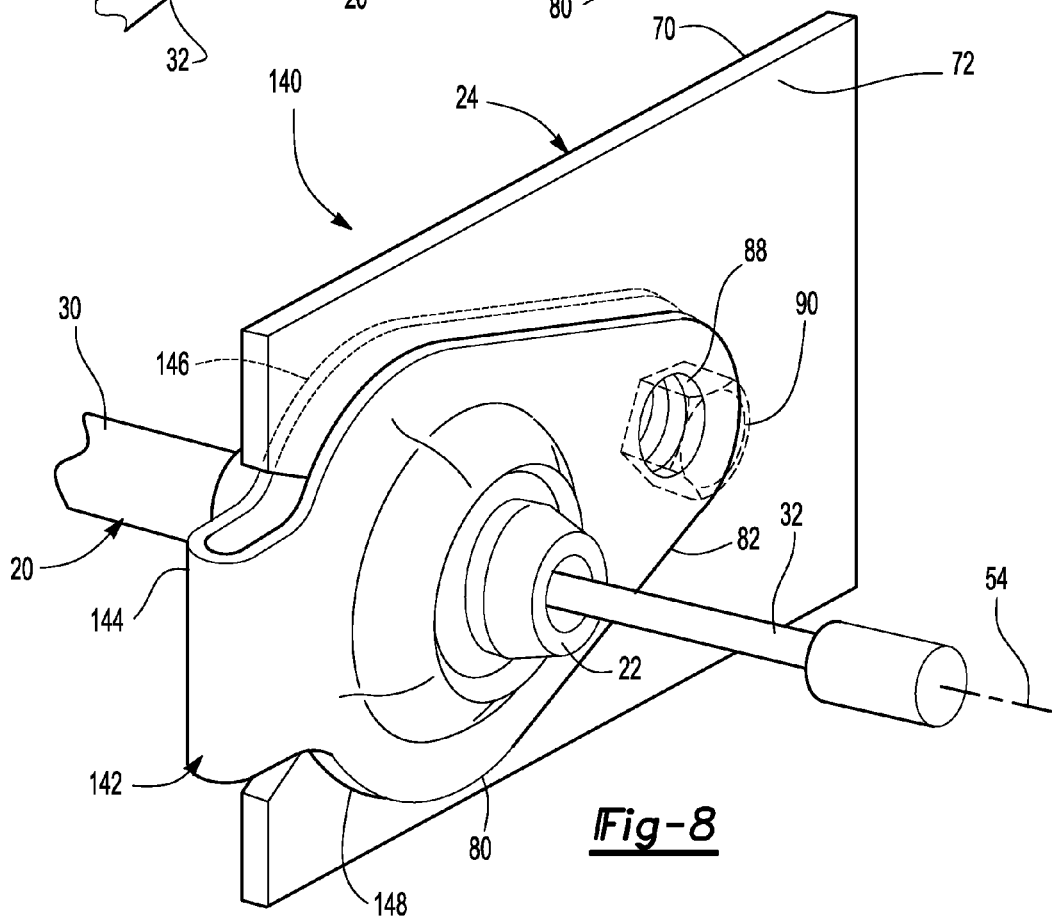

CABLE MOUNTING ASSEMBLY

TECHNICAL FIELD

This patent application relates to a cable mounting assembly.

BACKGROUND

A cable flexible joint is disclosed in U.S. Pat. No. 4,790,205.

SUMMARY

In at least one embodiment, a cable mounting assembly is provided. The cable mounting assembly may include an abutment, a ball fitting, and a bracket. The abutment may have an abutment hole. The ball fitting may be disposed in the abutment hole and may have a hole through which a cable assembly extends. The bracket may be disposed on the abutment and may have a socket that receives the ball fitting. Rotation of the ball fitting may be inhibited when the bracket exerts a compressive force on the ball fitting.

In at least one embodiment, a cable mounting assembly is provided. The cable mounting assembly may include an abutment, a bracket, a ball fitting, and a cable received in a conduit. The abutment may have an abutment hole. The bracket may be disposed on the abutment and may have a bracket hole. The ball fitting may be disposed in the abutment hole and in the bracket hole. The conduit may extend partially through a hole in the ball fitting. The cable may extend through the abutment hole, the bracket hole, and the hole in the ball fitting.

In at least one embodiment, a cable mounting assembly is provided. The cable mounting assembly may include a cable assembly, an abutment, and a bracket. The cable assembly may extend through a ball fitting that has a ball portion having a curved outer surface. The abutment may have a first surface and an abutment socket that extends away from the first surface. The bracket may be disposed on the abutment and may have a bracket socket that extends away from the first surface. The bracket and abutment may engage the curved outer surface of the ball fitting.

BRIEF DESCRIPTION OF THE DRAWINGS

FIG. 1 is an exploded view of a cable mounting assembly.

FIG. 2 is a section view of the cable mounting assembly shown in FIG. 1.

FIG. 3 is an exploded view of another embodiment of a cable mounting assembly.

FIG. 4 is a section view of the cable mounting assembly shown in FIG. 3.

FIGS. 5-8 are perspective views of additional embodiments of cable mounting assemblies.

DETAILED DESCRIPTION

Figure 5:
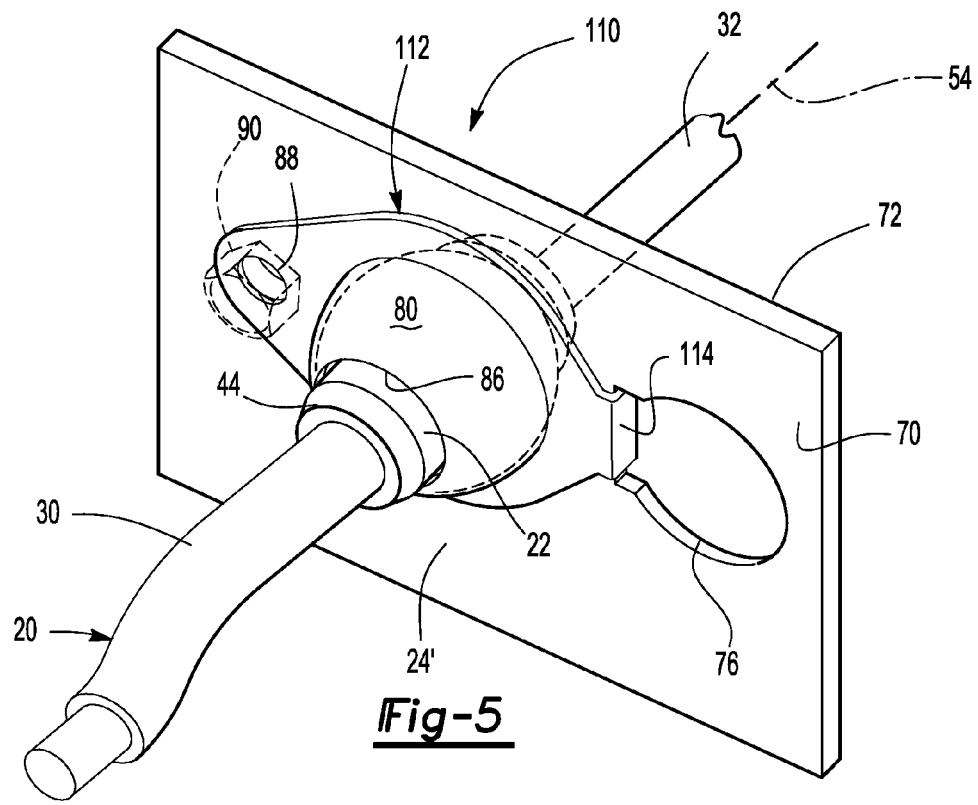

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 and 2, an exemplary cable mounting assembly 10 is shown. The cable mounting assembly 10 may be configured to help position and secure a cable assembly as will be discussed in more detail below. The cable mounting assembly 10 may be provided with a vehicle, such as a motor vehicle like a car or truck. In a vehicular application, one or more cable mounting assemblies 10 may be used with a cable disposed on a vehicle, such as a parking brake cable, transmission cable, throttle cable, window regulator cable, or a closure latch cable for a latch for a closure like a hood, trunk, liftgate, or fuel door. It is also contemplated that the cable mounting assembly 10 may be employed in non-vehicular applications.

In at least one embodiment, the cable mounting assembly 10 may include a cable assembly 20, a ball fitting 22, an abutment 24, and at least one bracket 26.

The cable assembly 20 may be configured to transmit force to actuate another component, such as a brake, latch, window, transmission or throttle component. The cable assembly 20 may include a conduit 30 and a cable 32.

The conduit 30 may be configured as a flexible tube that receives the cable 32. As such, the conduit 30 may help shield or protect the cable 32 from environmental contaminants or damage. The conduit 30 may have a first end 34, a second end 36, and a conduit hole 38 that extends from the first end 34 to the second end 36. The conduit hole 38 may extend around and may be generally coaxially arranged with the cable 32. The conduit 30 may be made of any suitable material, such as a polymeric material like plastic.

The cable 32 may be received in the conduit 30. More specifically, the cable 32 may extend through the conduit hole 38 and may move or slide with respect to the conduit 30 to transmit force. The cable 32 may be longer than the conduit 30. As such, the ends of the cable 32 may extend from the first and second ends 34, 36 of the conduit 30. The cable 32 may be a flexible cable and may be made of any suitable material, such as a metal or a polymeric material. In at least one embodiment, the cable 32 may be a braided or twisted wire cable.

The ball fitting 22 may be configured to receive the cable assembly 20. In at least one embodiment, the ball fitting 22 may include a ball portion 40, a hole 42, and a stop portion 44. The ball fitting 22 may have a unitary or one-piece construction.

The ball portion 40 may be configured to permit the ball fitting 22 to rotate with respect to the abutment 24 and bracket 26. In addition, the ball portion 40 may be configured to carry or transfer load forces to the abutment 24 without damage or degradation. The ball portion 40 may have a curved outer surface 50 that may extend around the ball fitting 22. The curved outer surface 50 may have any suitable configuration that facilitates multidirectional rotation of the ball fitting 22. For example, the curved outer surface 50 may be radially disposed with respect to the center 52 of the ball fitting 22, thereby making a generally spherical or toroidal configuration that may extend around the hole 42 or may have a parabolic or other configuration that facilitates multidirectional rotation.

The hole 42 may extend along an axis 54 that may extend through the center 52 of the ball fitting 22. The hole 42 may be substantially linear and may have a first end 60 and a second end 62 disposed opposite the first end 60. The cable assembly 20 may extend through the hole 42. For instance, the hole 42 may be configured such that the cable 32 may extend completely through the hole 42 while the conduit 30 may not extend completely through the hole 42. The hole 42 may have a first hole portion 64 that may be disposed proximate the first end 60 of the hole 42 and a second hole portion 66 that may be disposed proximate the second end 62 of the hole 42. The first and second hole portions 64, 66 may have a larger diameter than the cable 32 to permit the cable 32 to move freely through the ball fitting 22. In addition, the first hole portion 64 may have a larger diameter than the second hole portion 66. As such, a step surface 68 may be disposed at the bottom of the first hole portion 64 that may extend to the second hole portion 66. The conduit 30 may be fixedly received in the first hole portion 64. Moreover, the first end 34 of the conduit 30 may engage the step surface 68 to inhibit axial movement of the conduit 30 through the ball fitting 22.

One or more stop portions 44 may also be provided with the ball fitting 22. A stop portion 44 may be configured to engage the abutment 24 or a bracket 26 to limit rotation of the ball fitting 22 as will be discussed in more detail below. A stop portion 44 may extend from the curved outer surface 50 and help define the hole 42 in one or more embodiments. In FIGS. 1 and 2, two stop portions 44 are shown with one stop portion 44 being disposed proximate the first end 60 of the hole 42 and another stop portion 44 being disposed proximate the second end 62 of the hole 42. As such, the stop portions 44 may extend in opposite directions from the ball portion 40. In at least one embodiment, a stop portion 44 may be configured as a collar or ring that may extend continuously around the hole 42 and may be radially disposed about the axis 54. In the embodiment shown in FIGS. 1 and 2, the stop portion 44 at the first end 60 may extend around and may engage the conduit 30 while the stop portion 44 at the second end 62 may be extend around and may be spaced apart from the cable 32. In addition, rotation of the ball fitting 22 may be inhibited when a stop portion 44 engages a corresponding bracket 26.

The abutment 24 may be a structural member through which the cable assembly 20 may extend. In a vehicular application, the abutment 24 may be a bracket, frame, body structure, or the like. The abutment 24 may have a first surface 70, a second surface 72, an abutment hole 74, and optionally one or more bracket mounting openings 76.

The first surface 70 may be disposed opposite the second surface 72. The abutment hole 74 may extend from the first surface 70 to the second surface 72 and may have any suitable configuration. For example, the abutment hole 74 may be a through hole or an open ended slot. The cable assembly 20 and ball fitting 22 may be disposed in and may extend through the abutment hole 74. The ball fitting 22 may be configured to rotate with respect to the abutment hole 74 prior to application of a sufficient compressive load force by a bracket 26 as will be discussed in more detail below.

One or more bracket mounting openings 76 may be provided to facilitate mounting of one or more brackets 26 to the abutment 24. A bracket mounting opening 76, if provided, may be disposed near the abutment hole 74 or may extend from the abutment hole 74. In FIG. 1, two bracket mounting openings 76 are shown that are spaced apart from and disposed on opposite sides of the abutment hole 74. A bracket mounting opening 76 may receive a fastener or a portion of the bracket 26 to help mount and secure the bracket 26 to the abutment 24.

One or more brackets 26 may be mounted to the abutment 24. A bracket 26 may receive and may help secure the ball fitting 22 as will be discussed in more detail below. In addition, a bracket 26 may help inhibit contaminants such as particulates and/or water from damaging or degrading the ball fitting 22 or other cable mounting assembly components. In FIGS. 1 and 2, two brackets 26 are shown that are disposed on opposite sides of the abutment 24 and that cooperate to receive the ball fitting 22. In at least one embodiment, the bracket 26 may include a socket 80 and a flange 82. The socket 80 and flange 82 may be integrally formed such that the bracket 26 has a unitary or one-piece construction.

The socket 80 may be configured to receive the ball fitting 22. The socket 80 may extend away from the abutment 24 and may have a similar shape as the ball fitting 22. For example, the socket 80 may have an interior surface 84 that may be curved or that that may be generally hemispherical or have a dome-like shape that may mate with or generally align with the curved outer surface 50 or the ball fitting 22. As such, the socket 80 may be spaced apart from and may be radially disposed with respect to a vertex or center point that may be disposed on the axis 54. The socket 80 may include a bracket hole 86 through which the cable assembly 20 may extend. In FIGS. 1 and 2, the conduit 30 and cable 32 may extend through the bracket hole 86 of the bracket 26 disposed on the left side of the abutment 24 and the cable 32 may extend through the bracket hole 86 of the bracket 26 disposed on the right side of the abutment 24. The bracket hole 86 may be radially about the axis 54 in one or more embodiments. The ball fitting 22 may be received in the bracket hole 86. For instance, a stop portion 44 may be received in or extend through the bracket hole 86. The bracket hole 86 may be larger than the stop portion 44 to permit the ball fitting 22 to rotate in the socket 80. In FIGS. 1 and 2, the bracket hole 86 has a larger diameter than the outside diameter of the stop portion 44.

The flange 82 may extend outwardly from and may extend around the socket 80. The flange 82 may be configured to face toward and facilitate mounting to the abutment 24. In FIGS. 1 and 2, the flange 82 of the bracket 26 disposed on the left side of the abutment 24 may engage the first surface 70 of the abutment 24 while the flange 82 of the bracket 26 disposed on the right side of the abutment 24 may engage the second surface 72 of the abutment 24. In at least one embodiment, the flange 82 may include one or more fastener openings 88.

A fastener opening 88 may be aligned with a corresponding bracket mounting opening 76. A fastener 90, such as a bolt, clip, rivet, hook, or the like may extend into or through the fastener opening 88 and corresponding bracket mounting opening 76 to help mount and secure the bracket 26 to the abutment 24. Alternatively, the bracket 26 or abutment 24 may include a fastener that may facilitate mounting. For example, a protrusion or integral fastener may be provided on the abutment 24 that is received in the fastener opening 88, in which case a corresponding bracket mounting opening 76 may be omitted in one or more embodiments. Conversely, a protrusion or integral fastener may be provided on the bracket 26 that may be received in a bracket mounting opening 76, in which case a corresponding fastener opening 88 may be omitted in one or more embodiments. In FIGS. 1 and 2, two fastener openings 88 are shown that are spaced apart from each other and disposed on opposite sides of the socket 80. In this embodiment, a fastener 90 may extend through corresponding fastener openings 88 on both brackets 26 and a bracket mounting opening 76 to help secure both brackets 26 to the abutment 24.

The bracket 26 may be configured to permit or inhibit rotation of the ball fitting 22. For example, the bracket 26 may receive the ball fitting 22 such that the ball fitting 22 may rotate or move within the socket 80 when the bracket 26 does not exert a sufficient compressive load force against the ball fitting 22. As such, the ball fitting 22 may move within the socket 80 and self-center or self-orient when the bare cable 32 that extends from the second end 62 of the hole 42 of the ball fitting 22 is attached to or installed on another component. Such rotation may allow the ball fitting 22 to swivel or rotate to help reduce friction between the cable and the ball fitting 22 and/or conduit 30 and help inhibit kinking or substantial bending of the cable assembly 20 or cable 32. The bracket 26 may then be tightened against the abutment 24, which in turn may cause the bracket 26 to exert a load force on the ball fitting 22 to inhibit rotation of the ball fitting 22 or hold the ball fitting 22 in a fixed position. The bracket 26 may be tightened via the fastener 90 or by otherwise coupling the bracket 26 to the abutment 24 as will be discussed below. Optionally, one or more brackets 26 may also be configured to permit the ball fitting 22 to swivel or rotate after the bracket 26 is coupled to or tightened against the abutment 24 in any of the cable mounting assemblies described herein.

Referring to FIGS. 3 and 4, another embodiment of a cable mounting assembly 100 is shown. In this embodiment, only one bracket 26 is provided and the abutment 24' has an abutment hole 74 that at least partially defines or includes an abutment socket 102.

The abutment socket 102 may be integrally formed with the abutment 24' and may extend away from the bracket 26 or an adjacent portion of the first surface 70. The abutment socket 102 may receive the ball fitting 22 and may have a similar configuration as the socket 80 that is provided with the bracket 26. For example, the abutment socket 102 may have an interior surface 104 that may be curved or that that may be generally hemispherical or have a dome-like shape that may engage or generally align with the curved outer surface 50 of the ball fitting 22. As such, the socket 80 of the bracket 26 and the abutment socket 102 may cooperate to receive and retain the ball fitting 22.

The cable assembly 20 may extend through the abutment hole 74 and/or abutment socket 102. In FIGS. 3 and 4, the conduit 30 and cable 32 may extend through the bracket hole 86 and the cable 32 may extend through the abutment hole 74 and abutment socket 102.

The ball fitting 22 may be received in the abutment hole 74. For instance, a stop portion 44 may be received in or extend through the abutment hole 74. The abutment hole 74 may be larger than the stop portion 44 to permit the ball fitting 22 to rotate in the abutment socket 102. Moreover, the stop portion 44 that extends through the abutment hole may engage the abutment 24' inhibit rotation of the ball fitting 22. In addition, a sufficient compressive force exerted by the bracket 26 on the ball fitting 22 may force the ball fitting 22 against the interior surface 104 to inhibit rotation of the ball fitting 22.

Referring to FIG. 5, another embodiment of a cable mounting assembly 110 is shown. In this embodiment, the bracket 112 includes one fastener opening 88 and a mounting feature 114. The mounting feature 114 may be disposed on an opposite side of the axis 54 or socket 80 from the fastener opening 88. The mounting feature 114 may be configured to engage the abutment 24' to help secure the bracket 112 to the abutment 24'. For example, the mounting feature 114 may extend through the bracket mounting opening 76 and may be configured with a barb or hook that may engage the second surface 72 of the abutment 24'. As such, the bracket 112 may be hooked onto the abutment 24' with the mounting feature 114 and a fastener 90 may be tightened so that the bracket 112 may be secured to the abutment 24' and/or may exert a compressive force to inhibit rotation of the ball fitting 22.

Figure 6:
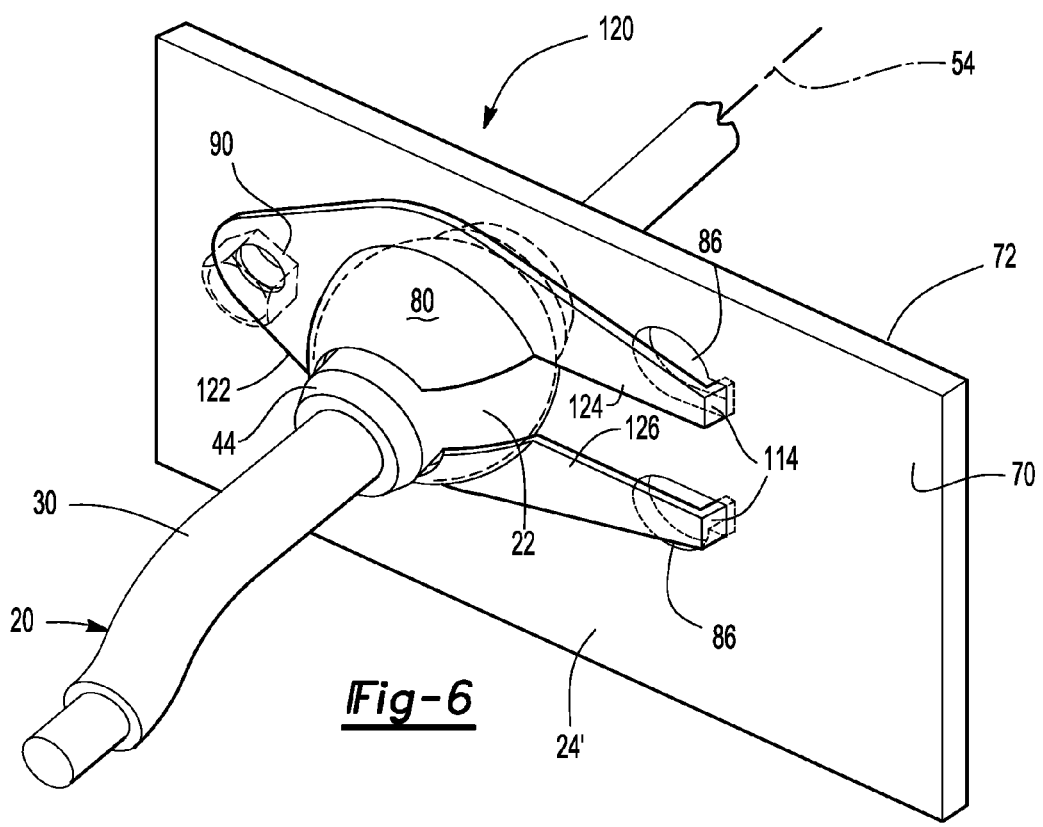

Referring to FIG. 6, another embodiment of a cable mounting assembly 120 is shown. In this embodiment, the bracket 122 includes a first arm 124 and a second arm 126. The first and second arms 124, 126 may be spaced apart from each other and may extend from the socket 80. The first and second arms 124, 126 may each include a mounting feature 114. The mounting features 114 may extend through a common bracket mounting opening 76 or different bracket mounting openings 76 in the abutment 24' and may engage the abutment 24' to help secure the bracket 122 to the abutment 24'. The mounting feature 114 may be configured with a barb or hook and may engage the second surface 72 of the abutment 24'. In addition, the socket 80 may be discontinuous between the first and second arms 124, 126 and may not extend continuously around the axis 54.

Referring to FIG. 7, another embodiment of a cable mounting assembly 130 is shown. This embodiment is similar to the cable mounting assembly 120 shown in FIG. 6, but the bracket 132 does not have a fastener opening. Instead, the bracket 132 has a clip portion 134 for securing the bracket 132 to the abutment 24'. The clip portion 134 may be disposed on an opposite side of the socket 80 from the mounting feature 114 and may hook onto the abutment 24' to secure the bracket to the abutment 24'. The clip portion 134 may hook onto an end surface of the abutment 24' or may extend through a hole or bracket mounting opening 76 of the abutment 24' that is sufficiently large to receive the clip portion 134. The clip portion 134 may be configured to flex to allow the clip portion 134 to snap or hook onto the abutment 24'. The clip portion 134 may include a tab 136 that may extend away from the cable assembly 20 to facilitate installation or removal. Moreover, the bracket 132 may exert a compressive load on the ball fitting 22 when the clip portion 134 is installed or hooked onto the abutment 24' to inhibit rotation of the ball fitting 22.

Referring to FIG. 8, another embodiment of a cable mounting assembly 140 is shown. In this embodiment, the abutment 24 may be similar to that shown in FIG. 1. The bracket 142 may be configured to wrap around the abutment 24 and may include a bend portion 144, a first bracket panel 146, and a second bracket panel 148. The bend portion 144 may be generally U-shaped. The first and second bracket panels 146, 148 may be spaced apart from each other and may extend from opposite ends of the bend portion 144. Moreover, the first and second bracket panels 146, 148 may be disposed on opposite sides of the abutment 24. As such, the first and second bracket panels 146, 148 may engage the first and second surfaces 70, 72 of the abutment 24, respectively. The first and second bracket panels 146, 148 may be configured as mirror images of each other and may include a socket 80 and flange 82 as previously described. The sockets 80 may cooperate to receive the ball fitting 22. The first and second bracket panels 146, 148 may be sprung apart, or disposed in a nonparallel relationship prior to installation on the abutment 24 to permit the ball fitting 22 to rotate within the sockets 80. A fastener 90 may be inserted through the fastener openings 88 in the first and second bracket panels 146, 148 and through a bracket mounting opening 76 in the abutment 24 to secure the bracket 142 to the abutment 24. The fastener 90 may squeeze the first and second bracket panels 146, 148 towards each other when the fastener 90 is tightened, thereby causing the first and second bracket panels 146, 148 to exert a compressive load force on the ball fitting 22.

The cable mounting assemblies described above may allow a cable angle to change or adjust to accommodate tolerance variations or build tolerances. In addition, the cable mounting assemblies may allow a cable to self-align or swivel with respect to an abutment to accommodate different cable lengths or cable assembly mounting positions that may vary between vehicles or parts to help avoid misalignment and reduce friction upon the cable. Moreover, cable mounting assemblies may be provided at opposite ends of a bare length of cable to increase the range of cable angle adjustment. In addition, cable mounting assemblies may allow a desired cable position or cable angle to be maintained by inhibiting movement of a ball fitting, which may also help reduce rattling or noise.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cable mounting assembly comprising:
   an abutment having a bracket mounting opening that extends from a first surface to a second surface disposed opposite the first surface, and an abutment socket extending around an abutment hole;
   a ball fitting disposed in the abutment hole on the abutment socket, wherein a cable assembly extends through the ball fitting;
   a bracket that engages the abutment, is a separate component from the abutment, does not engage the abutment socket, does not extend through itself, has a socket that receives the ball fitting, and has a mounting feature that extends through the bracket mounting opening such that the bracket engages the first surface directly opposite where the mounting feature engages the second surface; and
   a threaded fastener that only extends through the abutment, the bracket, and a nut such that a head of the threaded fastener engages the bracket but not the abutment and the nut engages the abutment but not the bracket;
   wherein the bracket exerts compressive force to inhibit rotation of the ball fitting so that the ball fitting is not rotatable in the socket and abutment socket.

2. The assembly of claim 1 wherein rotation of the ball fitting is permitted prior to tightening the bracket against the abutment.

3. The assembly of claim 1 wherein the abutment socket extends away from the bracket and engages the ball fitting to retain the ball fitting in the abutment hole.

4. The assembly of claim 3 wherein the socket of the bracket and the abutment socket each have curved surfaces that mate with a substantially spherical ball portion of the ball fitting.

5. A cable mounting assembly comprising:
   an abutment having a first surface, a second surface disposed opposite the first surface, an abutment socket integrally formed with the abutment, an abutment hole that extends from the first surface to the second surface, and a bracket mounting opening that extends from the first surface to the second surface;
   a bracket that is disposed on the abutment and that has a bracket hole, wherein the bracket is a separate component that is removable from the abutment, the bracket does not engage the abutment socket, the bracket does not extend into the abutment hole, the bracket engages the first surface adjacent to the abutment hole, and the bracket has a mounting feature that extends through the bracket mounting opening such that the bracket engages the first surface directly opposite where the mounting feature engages the second surface such that the mounting feature does not extend across the bracket mounting opening;
   a ball fitting disposed in the abutment hole and the bracket hole, wherein the ball fitting engages the bracket and the abutment and has a ball fitting hole;
   a single threaded fastener that only extends through the abutment, the bracket, and a nut such that a head of the threaded fastener engages the bracket but not the abutment and the nut engages the abutment but not the bracket, wherein the ball fitting is the only component disposed between the abutment and the bracket and the abutment and the bracket are the only components disposed between the nut and the head of the threaded fastener; and
   a cable received in a conduit that engages the cable;
   wherein the conduit extends partially but not completely through the ball fitting hole and the cable extends through the abutment hole, ball fitting hole, and bracket hole and the bracket exerts a compressive force on the ball fitting when the threaded fastener is tightened so that the ball fitting is not rotatable in the abutment socket.

6. The assembly of claim 5 wherein the conduit extends through the bracket hole but not the abutment hole.

7. The assembly of claim 5 wherein the ball fitting has a first stop portion disposed proximate a first end of the ball fitting hole, wherein rotation of the ball fitting is inhibited when the first stop portion engages the bracket.

8. The assembly of claim 7 wherein the first stop portion is configured as a ring that extends continuously around the conduit.

9. The assembly of claim 7 wherein the ball fitting has a second stop portion disposed proximate a second end of the ball fitting hole, wherein rotation of the ball fitting is inhibited when the second stop portion engages the abutment.

10. The assembly of claim 9 wherein the second stop portion is configured as a ring that extends continuously around the cable.

11. A cable mounting assembly comprising:
   a cable assembly that extends through a ball fitting;
   an abutment having a first surface, a second surface disposed opposite the first surface, an abutment socket that extends away from the first surface, and a bracket mounting opening;
   a bracket that disposed on the abutment and is a separate component that is removable from the abutment and that has a bracket socket that extends away from the first surface wherein the bracket only extends through the abutment in the bracket mounting opening and has a mounting feature that extends through the bracket mounting opening such that the bracket engages the first surface directly opposite where the mounting feature engages the second surface; and
   a threaded fastener that only extends through the abutment, the bracket, and a nut such that a head of the threaded fastener engages the bracket but not the abutment, the nut engages the abutment, and the threaded fastener is disposed on an opposite side of the abutment socket and the bracket socket from the bracket mounting opening, wherein the bracket exerts a compressive force on the ball fitting when the threaded fastener is tightened so that the ball fitting is not rotatable in the bracket socket and the abutment socket.

12. The cable mounting assembly of claim 11 wherein the cable assembly includes a cable and a conduit and the ball fitting has a ball fitting hole that includes a first hole portion and a second hole portion, wherein the cable extends through the first and second hole portions and an end of the conduit is disposed in the first hole portion.

13. The assembly of claim 12 wherein the first hole portion has a larger diameter than the second hole portion.

14. The assembly of claim 11 wherein the bracket and abutment engage a curved outer surface of the ball fitting to permit the ball fitting to rotate in the abutment and bracket sockets.

\* \* \* \* \*